(12) United States Patent
Reed et al.

(10) Patent No.: US 10,914,095 B2
(45) Date of Patent: Feb. 9, 2021

(54) FREESTANDING INTERNAL STRUCTURE ASSEMBLY FOR A WIND TURBINE TOWER

(71) Applicant: General Electric Company, Schenectady, NY (US)

(72) Inventors: James Eric Reed, Spartanburg, SC (US); Ronald Lawrence Yenser, Simpsonville, SC (US); Gary Wayne Holladay, Greenville, SC (US); Eduardo Moreno Benito, Mataro (ES); Sergi Unzueta Garcia, Barcelona (ES)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/366,475

(22) Filed: Mar. 27, 2019

(65) Prior Publication Data

US 2019/0301196 A1  Oct. 3, 2019

(30) Foreign Application Priority Data

Mar. 28, 2018 (EP) ..................... 18382216

(51) Int. Cl.
*E04H 12/34* (2006.01)
*F03D 13/20* (2016.01)
(Continued)

(52) U.S. Cl.
CPC ........... *E04H 12/342* (2013.01); *E04H 12/10* (2013.01); *F03D 13/20* (2016.05); *F03D 80/88* (2016.05); *E04B 1/98* (2013.01); *E04H 2012/006* (2013.01)

(58) Field of Classification Search
CPC ......... E04H 12/342; E04H 12/10; E04B 1/98; E04B 1/348; E04B 1/24; F03D 13/20; F03D 80/80; F03D 80/82
See application file for complete search history.

(56) References Cited

U.S. PATENT DOCUMENTS 3,858,530 A * 1/1975 Jaffee ..................... A47B 57/18
                                                    108/107
7,805,893 B2 * 10/2010 Scholte-Wassink .... F03D 80/82
                                                     52/40

(Continued)

FOREIGN PATENT DOCUMENTS

WO WO2006/056196 A1 6/2006
WO WO2008/000565 A2 1/2008

(Continued)

OTHER PUBLICATIONS

European Search Report Corresponding to EP18382216 dated Sep. 20, 2018.

*Primary Examiner* — Beth A Stephan
(74) *Attorney, Agent, or Firm* — Dority & Manning. P.A.

(57) ABSTRACT

A tower assembly for a wind turbine includes a tower and a freestanding internal tower structure assembly. The tower has a tower wall defining an inner surface and an outer surface separated by a tower wall thickness, with the inner surface defining a tower interior. The internal tower structure assembly is positioned within the tower interior. The tower structure assembly includes a plurality of stackable support structures configured to support one or more internal tower components. Further, the tower structure assembly is freestanding within the tower interior.

17 Claims, 7 Drawing Sheets

(51) Int. Cl.
  *E04H 12/10* (2006.01)
  *F03D 80/80* (2016.01)
  *E04B 1/98* (2006.01)
  *E04H 12/00* (2006.01)

(56) References Cited

U.S. PATENT DOCUMENTS

| | | | |
|---|---|---|---|
| 7,997,213 B1* | 8/2011 | Gauthier | B65D 88/129 |
| | | | 108/53.1 |
| 8,839,586 B2* | 9/2014 | Edenfeld | E04H 12/34 |
| | | | 52/651.07 |
| 9,869,293 B2 | 1/2018 | Nielsen | |
| 10,302,070 B2* | 5/2019 | Donescu | E02B 17/0004 |
| 2007/0296220 A1* | 12/2007 | Kristensen | F03D 13/10 |
| | | | 290/55 |
| 2009/0223139 A1* | 9/2009 | Meiners | F03D 80/80 |
| | | | 52/40 |
| 2009/0284012 A1 | 11/2009 | Mortensen | |
| 2010/0135792 A1* | 6/2010 | Niehues | F03D 80/80 |
| | | | 416/1 |
| 2010/0139180 A1* | 6/2010 | Meiners | F03D 13/10 |
| | | | 52/111 |
| 2012/0066998 A1* | 3/2012 | Tobinaga | F03D 9/25 |
| | | | 52/651.01 |
| 2012/0306214 A1 | 12/2012 | Kristensen | |
| 2013/0115054 A1 | 5/2013 | Yokoyama et al. | |
| 2014/0147272 A1 | 5/2014 | Donescu et al. | |
| 2015/0292263 A1 | 10/2015 | Hierl | |
| 2015/0361679 A1* | 12/2015 | Kent | E04G 3/20 |
| | | | 52/40 |
| 2016/0108896 A1* | 4/2016 | Jane Panella | E04B 1/40 |
| | | | 52/36.4 |
| 2017/0350372 A1* | 12/2017 | Kirkley | E04C 5/08 |

FOREIGN PATENT DOCUMENTS

| WO | WO2012/130245 A2 | 10/2012 |
|---|---|---|
| WO | WO2015/078476 A1 | 6/2015 |

\* cited by examiner

FREESTANDING INTERNAL STRUCTURE ASSEMBLY FOR A WIND TURBINE TOWER

FIELD

The present subject matter relates generally to wind turbines and, more particularly, to an internal structure assembly for wind turbine towers that houses and/or supports internal tower components without being mechanically connected to the tower wall.

BACKGROUND

Wind power is considered one of the cleanest, most environmentally friendly energy sources presently available, and wind turbines have gained increased attention in this regard. A modern wind turbine typically includes a tower, generator, gearbox, nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

A conventional wind turbine tower is installed by first installing a foundation, mounting associated equipment and preassembled power modules to the foundation, assembling one or more tower sections on the foundation around the equipment and/or preassembled power module (e.g. down-tower electrical components such as the power converter, etc.), and then mounting required ladders, service lift(s), cable trays, power cables, platforms, etc. to the internal tower wall via a plurality of mechanical joints.

The mechanical connections for securing the various tower components described herein often require welded bosses and complex joints that create multiple areas of stress concentration along the tower wall. As such, the tower wall must be designed to accommodate such stresses. In addition, assembly of such mechanical connections is time consuming and labor intensive.

In view of the aforementioned issues, an internal structure assembly for wind turbine towers that houses and/or supports internal tower components without being mechanically connected to the tower wall would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a tower assembly for a wind turbine. The tower assembly includes a tower having a tower wall defining an inner surface and an outer surface separated by a tower wall thickness. Further, the inner surface defines a tower interior. The tower assembly further includes an internal tower structure assembly positioned within the tower interior. The tower structure assembly includes a plurality of stackable support structures configured to support one or more internal tower components. Further, the tower structure assembly is freestanding within the tower interior.

In one embodiment, each of the plurality of stackable support structures includes one or more alignment pins arranged on a top surface thereof that is configured to secure the stackable support structure to an adjacent stackable support structure. In such embodiments, the top surface of each of the plurality of stackable support structures defines a plurality of corners, with each corner containing one of the alignment pins.

In another embodiment, the tower assembly further includes at least one bumper component coupled to the tower structure assembly and contacting the inner surface of the tower wall. As such, the bumper component(s) is configured to reduce oscillations of the tower structure assembly.

In further embodiments, the internal tower component(s) may include one or more ladders, one or more platforms, a service lift, cables, a plurality of cable trays, a drip loop, a fall arrest system, and/or one or more wind turbine electrical components, including for example, a power converter, a transformer, a fan, or a wind turbine controller.

In additional embodiments, the tower assembly may also include at least one cross beam positioned in the tower interior for supporting the service lift. In several embodiments, the tower assembly may include one or more attachment arms extending from one or more of the plurality of stackable support structures for supporting the one or more ladders. In another embodiment, one or more of the stackable support structures may have a first side defining the plurality of cable trays.

In certain embodiments, a stackable base support structure of the tower support assembly is sized to fit over the power converter. In such embodiments, the tower assembly may further include a base platform having an aperture configured to receive the stackable base support structure. In further embodiments, the tower assembly may also include a grating platform positioned atop the stackable base support structure to allow the fan to exhaust.

In particular embodiments, the tower assembly may also include an additional ladder extending from a foundation of the tower through the base platform.

In another aspect, the present disclosure is directed to a wind turbine. The wind turbine includes a nacelle, a rotor mounted to the nacelle, and a tower assembly supporting the nacelle. The rotor includes a rotatable hub and at least one rotor blade. The tower assembly includes a tower having a tower wall defining an inner surface and an outer surface separated by a tower wall thickness. Further, the inner surface defines a tower interior. The tower assembly further includes an internal tower structure assembly positioned within the tower interior. The tower structure assembly includes a plurality of stackable support structures configured to support one or more internal tower components. Further, the tower structure assembly is freestanding within the tower interior. It should be further understood that the internal tower structure assembly may further include any of the additional features as described herein.

In yet another aspect, the present disclosure is directed to an internal tower structure assembly for a hollow tower. The internal tower structure assembly includes a plurality of support structures stackable atop each other in a vertical direction. Each of the plurality of support structures includes at least one alignment pin for connecting to an adjacent support structure. Thus, when stacked in the vertical direction, the plurality of support structures forms a freestanding structure for placement in the hollow interior. Further, the freestanding structure is configured to support one or more internal tower components. It should be further understood that the internal tower structure assembly may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
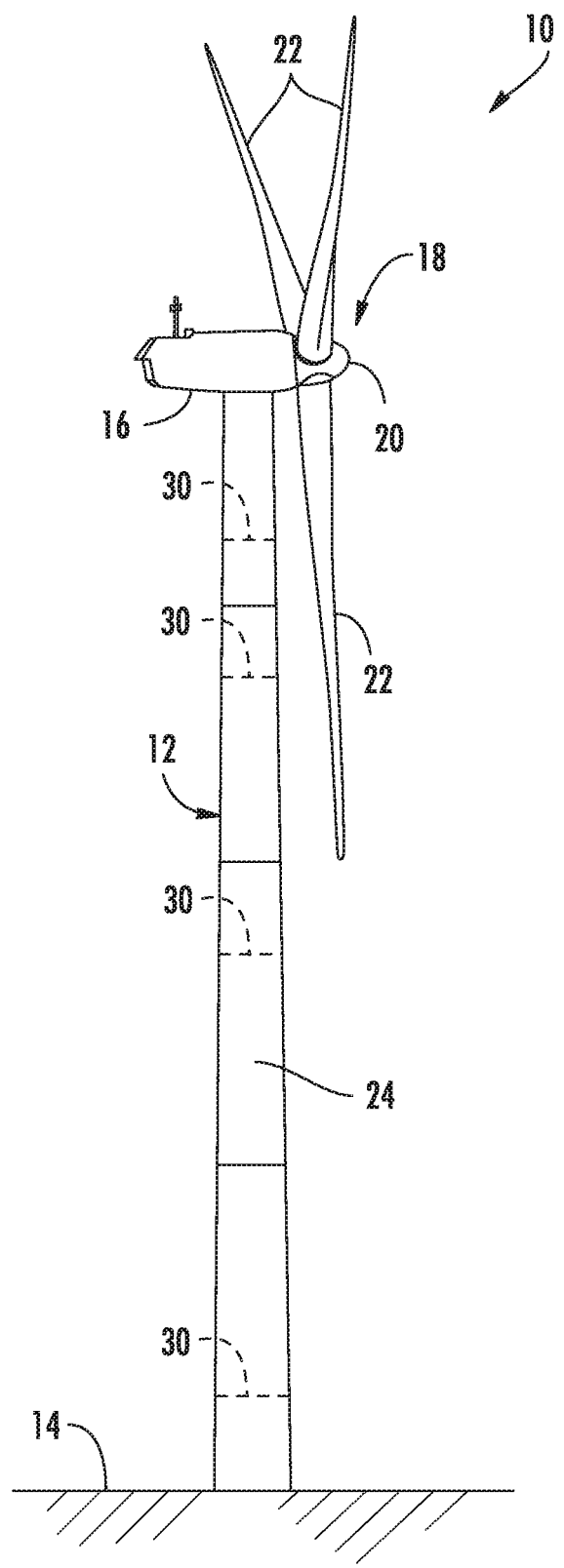
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

Figure 5:
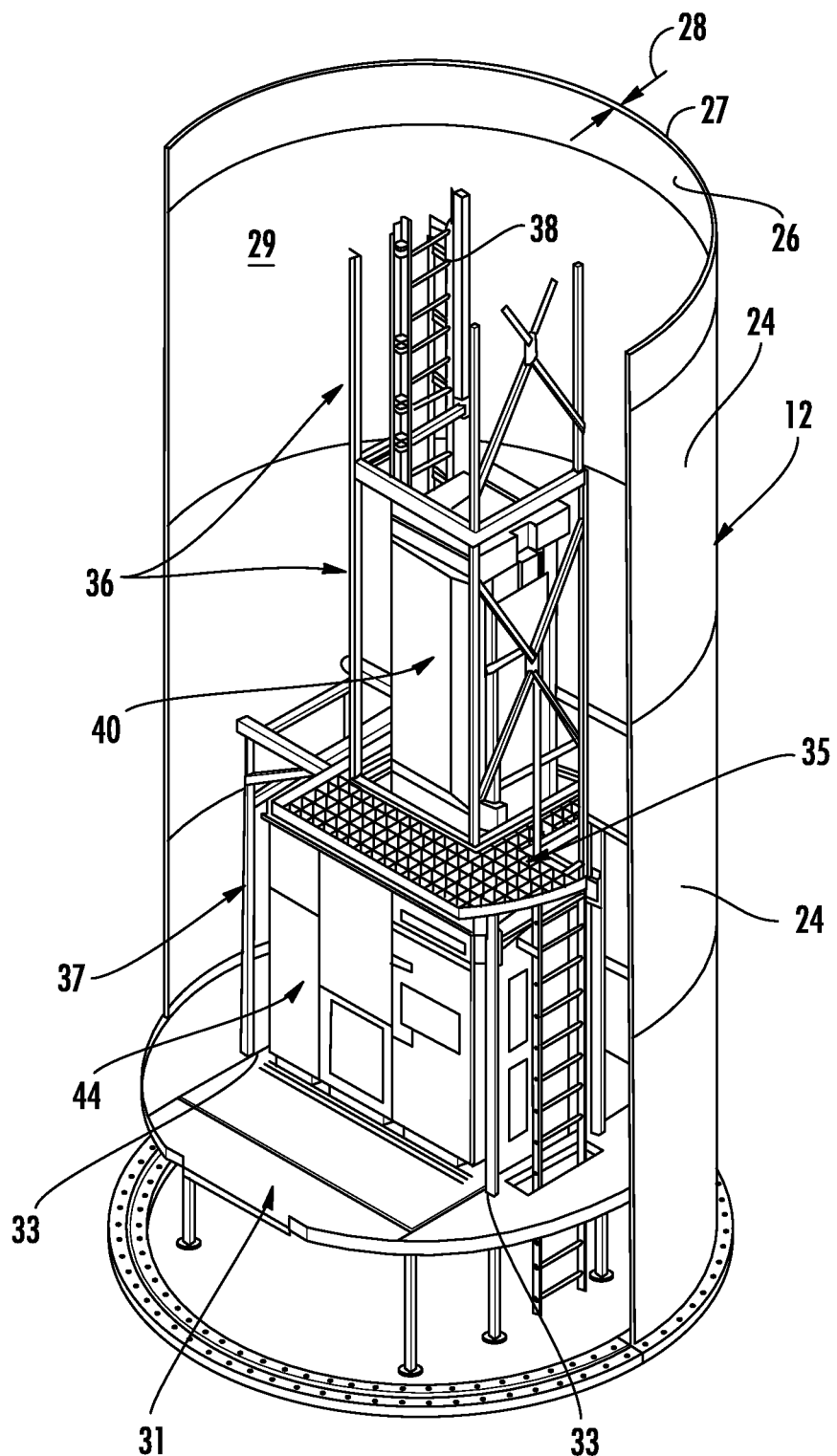
FIG. 5 illustrates a partial, perspective view of one embodiment of an internal tower structure assembly within a wind turbine tower according to the present disclosure.

In certain embodiments, as shown, the tower 12 may be formed of a plurality of tower sections 24 assembled atop one another. More specifically, as shown in FIG. 5, each tower section 24 may have a tower wall 25 defining an inner surface 26 and an outer surface 27 separated by a tower wall thickness 28. Thus, as shown, the inner surface 26 may define a tower interior 29. In such embodiments, the tower 12 may be made of any number of tower sections 24. For example, in the illustrated embodiment, the tower 12 includes four tower sections 24. In further embodiments, the tower 12 may be made of less than four or more than four tower sections 24. In addition, one or more tower sections 24 may include a platform 30 that provides operators safe access to areas of the wind turbine 10 that may require servicing, maintenance, and inspection.

Figure 2:
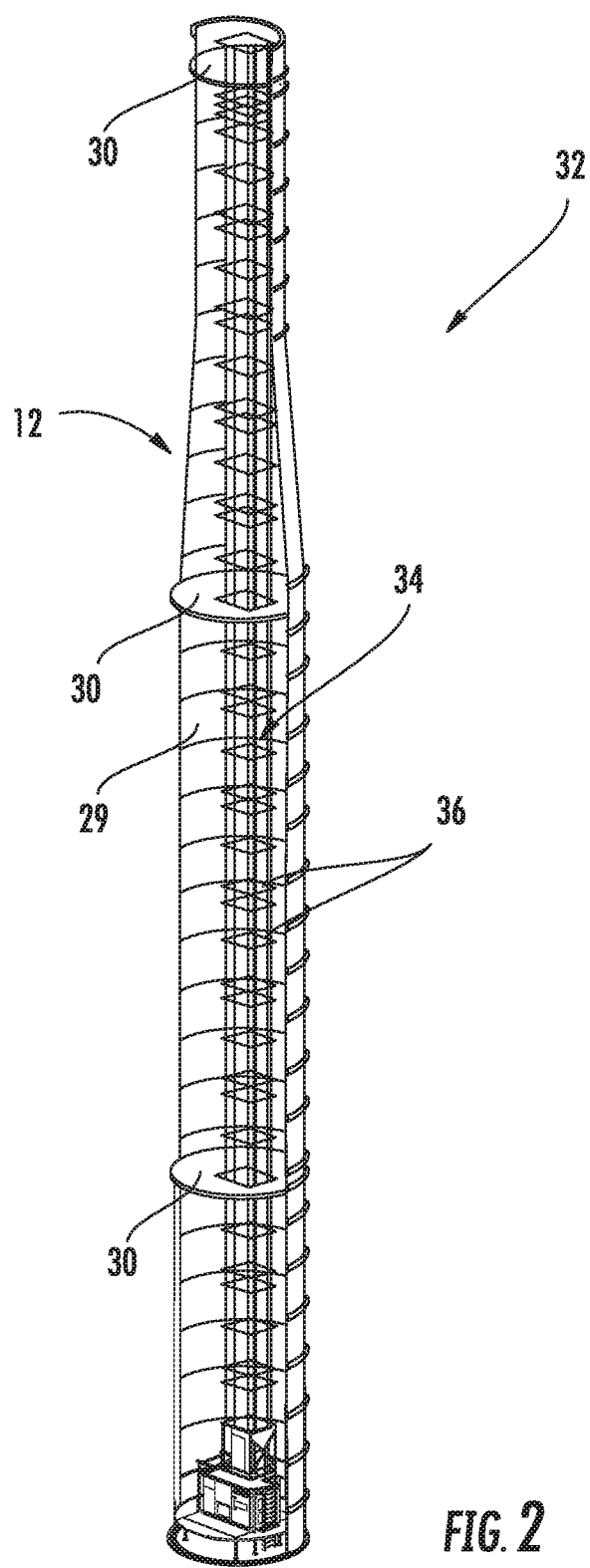
FIG. 2 illustrates an internal, perspective view of one embodiment of a tower assembly of a wind turbine according to the present disclosure.

Referring now to FIG. 2, an internal, perspective view of one embodiment of a tower assembly 32 for the wind turbine 10 according to the present disclosure is illustrated. As shown, the tower assembly 32 includes the tower 12 and a freestanding internal tower structure assembly 34 positioned within the tower interior 29. The tower structure assembly 34 includes a plurality of stackable support structures 36 stacked atop one another and designed to support one or more internal tower components. For example, as shown, the internal tower component(s) may include one or more ladders 38, one or more platforms 30, a service lift 40, cables 60, a plurality of cable trays 42, a drip loop, a fall arrest system, and/or one or more wind turbine electrical components, including for example, a power converter 44, a transformer, a fan 66, and/or a wind turbine controller.

Figure 3:
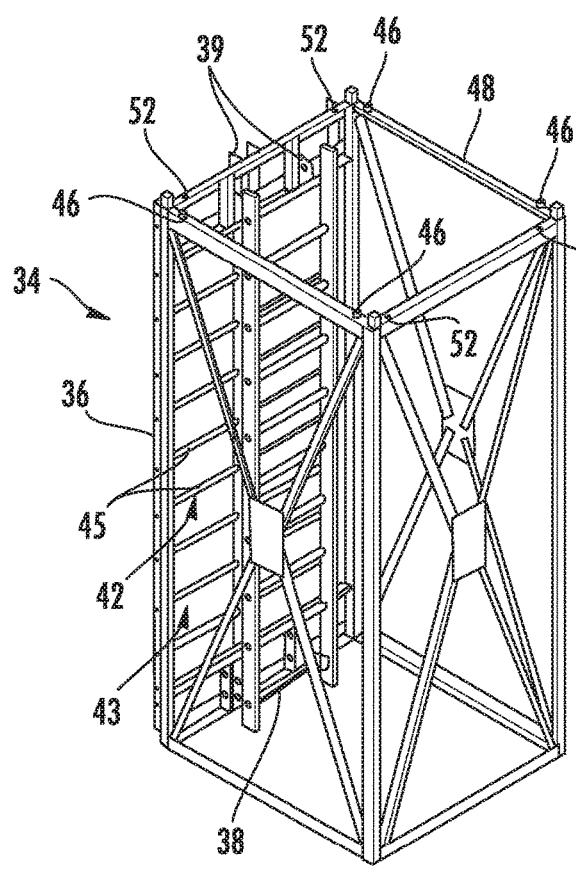
FIG. 3 illustrates a perspective view of one embodiment of a stackable support structure of an internal tower structure assembly for a wind turbine according to the present disclosure.
Figure 4:
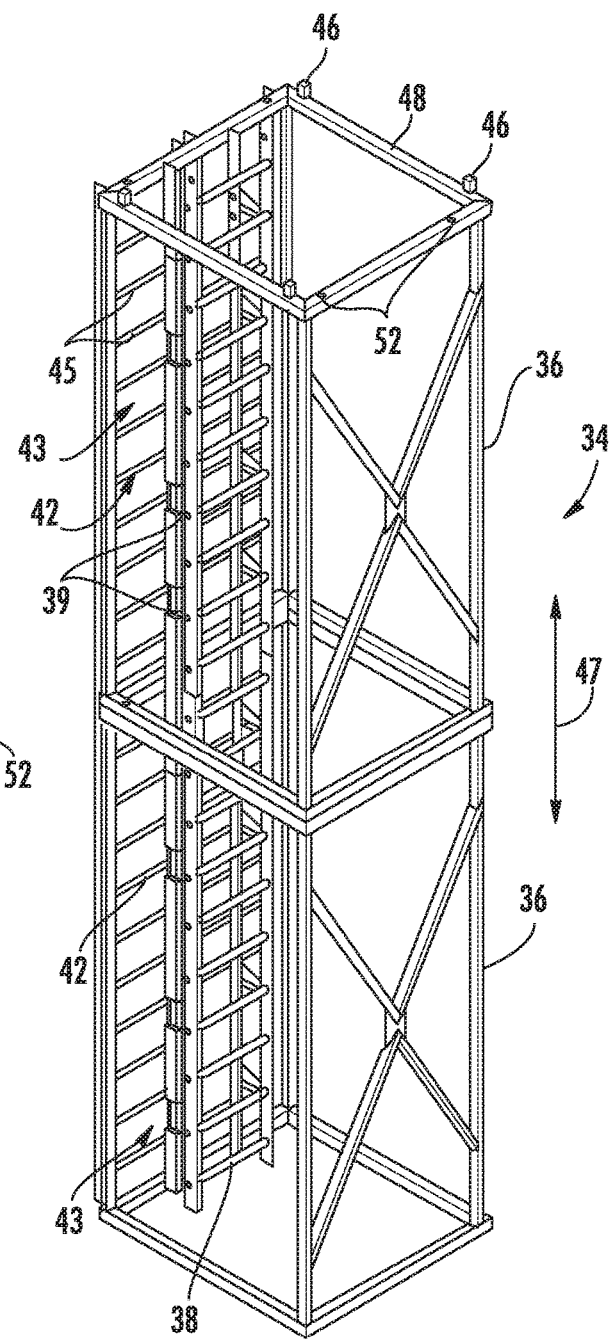
FIG. 4 illustrates a perspective view of one embodiment of an internal tower structure assembly constructed of a plurality of stackable support structures stacked in a vertical direction for a wind turbine according to the present disclosure.

Referring particularly to FIGS. 3 and 4, perspective views of the freestanding internal tower structure assembly 34 are illustrated. FIG. 3 illustrates a perspective view of one embodiment of a single support structure 36 of the tower structure assembly 34 according to the present disclosure. FIG. 4 illustrates a perspective view of one embodiment of a plurality of support structures 36 of the tower structure assembly 34 stacked atop each other in a vertical direction 45 according to the present disclosure. Thus, the freestanding internal tower structure assembly 34 of the present disclosure does not require welded-on bosses (or any other mechanical connections) to attach the internal tower components within the tower 12. As used herein, "freestanding" generally encompasses its plain and ordinary meaning and refers to the fact that the tower structure assembly 34 is not secured to tower 12 via a mechanical connection. Rather, in one embodiment, the structure assembly 34 stands alone within the tower interior 29 and is not mechanically fastened or connected to the tower wall 25.

Referring still to FIGS. 3 and 4, each of the plurality of stackable support structures 36 may include one or more alignment pins 46 arranged on a top surface 48 or a bottom surface 50 thereof. Thus, as shown, each support structure 36 may also include corresponding recesses 52 on the top and/or bottom surfaces 48, 50 thereof. As such, the alignment pins 46 of one of the stackable support structures 36 are configured to fit within the corresponding recesses 52 of an adjacent stackable support structure 36 such that the adjacent support structures 36 can be easily stacked and secured together. More specifically, as shown in the illustrated embodiment, the top and/or bottom surfaces 48, 50 of each of the plurality of stackable support structures 36 may define a plurality of corners 54, with each corner 54 containing one of the alignment pins 46 and/or the corresponding recesses 52. It should be further understood that the support structures 36 may have any suitable alignment features for aligning, stacking, and/or securing each of the support structures to another.

The support structures 36 of the present disclosure may also have any suitable shape. For example, as shown, each of the support structures 36 has a generally rectangular shape formed of a plurality of side walls each comprising a plurality of cross arms. In alternative embodiments, the support structures 36 may have a cylindrical shape that generally corresponds to the shape of the tower interior 29. Therefore, the support structures 36 of the present disclosure can be modified to accommodate any number and/or type of internal tower component.

Referring still to FIGS. 3 and 4, one or more of the stackable support structures 36 may include one or more attachment arms 39 extending therefrom for supporting one or more ladders 38 within the tower interior 29. Thus, as shown, the ladder 38 can be easily mounted to the attachment arms 39 at various heights such that personnel can use the ladder(s) 38 to access the various internal tower components described herein. In another embodiment, one or more of the stackable support structures 36 may have a first side 43 defining the plurality of cable trays 42. For example, as shown, the first side 43 may include a plurality of parallel support members 45 that form the cable trays 42 for supporting the various cables and/or drip loop within the tower interior 29.

Referring now to FIG. 5, the tower structure assembly 34 may further include a stackable base support structure 37 that is sized to fit over the power converter 44. Thus, as shown, the stackable base support structure 37 may be larger than remaining support structures 36. Alternatively, the base support structure 37 may be the same size as the remaining support structures 36. In such embodiments, the tower structure assembly 34 may further include a base platform 31 having at least one aperture 33 or opening that allows the base support structure 37 to pass through. For example, as shown, the base platform 31 generally includes at least four openings 33 that receive each of the legs 49 of the base support structure 37.

Figure 6:
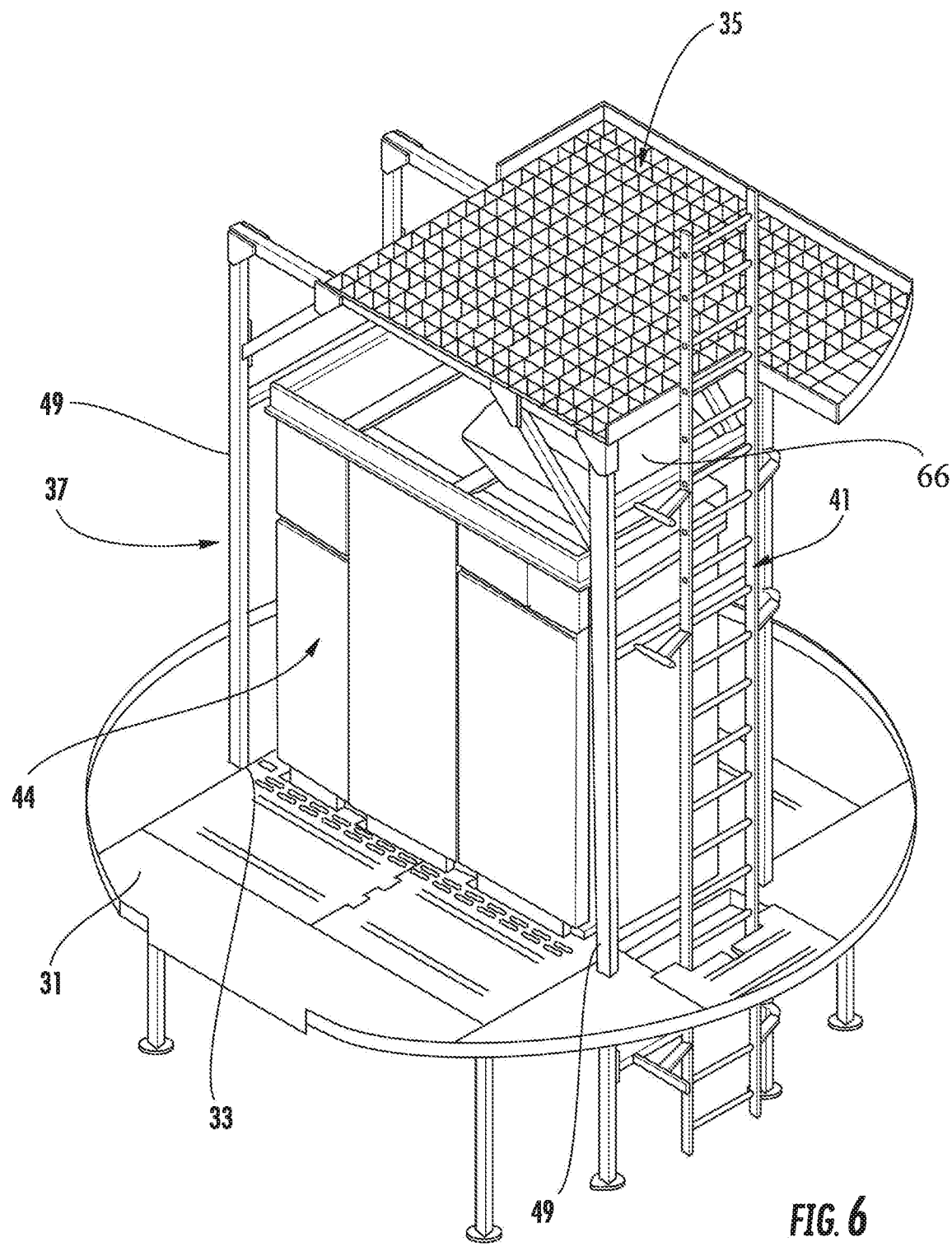
FIG. 6 illustrates a perspective view of one embodiment of a stackable base support structure of an internal tower structure assembly for a wind turbine tower according to the present disclosure.

Referring now to FIG. 6, the tower structure assembly 34 may further include one or more grating platforms 35. As used herein, a grating platform generally refers to a platform having a grid structure with one or more openings. Therefore, grating platforms are beneficial when used as stairways, walkways, and/or flooring in slippery, thermally-challenging, and steam-filled environments. Thus, as shown, the tower structure assembly 34 includes a grating platform positioned atop the stackable base support structure 37 so as to allow the fan 66 of the power converter 44 to exhaust therethrough. In addition, as shown in FIG. 6, the tower structure assembly 34 may also include an additional ladder 41 extending from the foundation 14 of the tower 12 through the base platform 31 and up to the grating platform 35. Thus, the additional ladder 41 allows personnel easy access from the base platform 31 to the internal tower structure assembly 34 and to any of the necessary internal tower components described herein.

Figure 7:
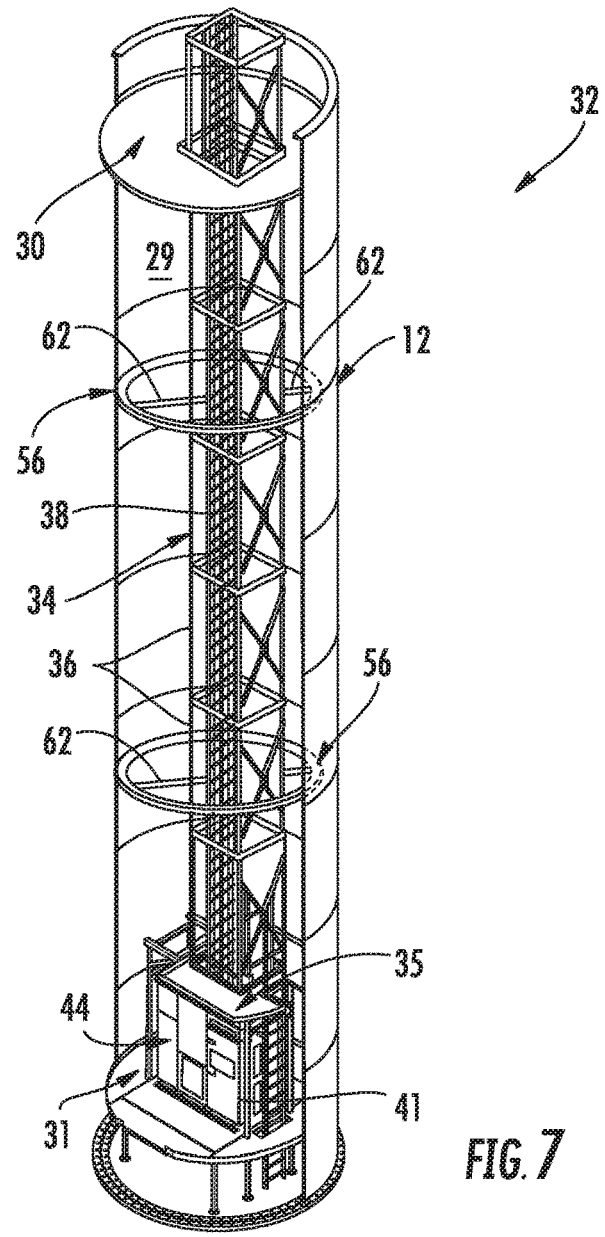
FIG. 7 illustrates a partial, perspective view of one embodiment of an internal tower structure assembly within a wind turbine tower according to the present disclosure, particularly illustrating a cross beam mounted within the tower for supporting a service lift.
Figure 8:
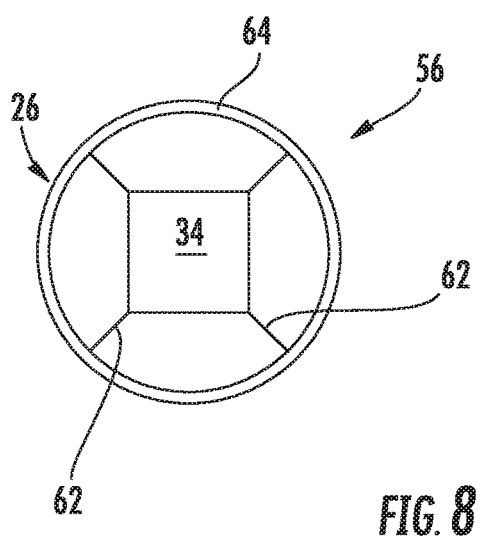
FIG. 8 illustrates a top view of one embodiment of a bumper component of an internal tower structure assembly according to the present disclosure.
Figure 9:
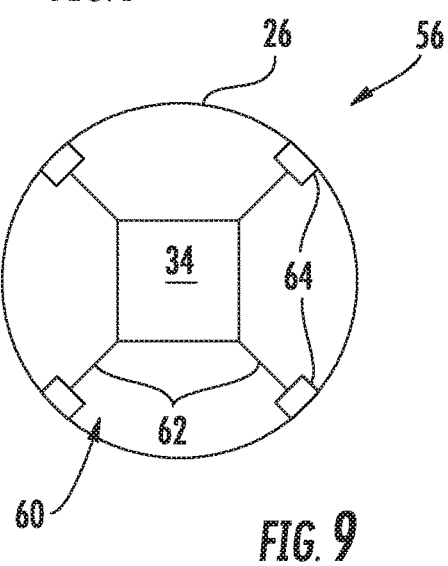
FIG. 9 illustrates a top view of another embodiment of a bumper component of an internal tower structure assembly according to the present disclosure.

Referring now to FIGS. 7-9, the tower structure assembly 34 may also include at least one bumper component 56 coupled thereto and contacting the inner surface 26 of the tower wall 25. As such, the bumper component(s) 56 is configured to reduce oscillations of the tower structure assembly 34. For example, as shown in FIGS. 7 and 8, each of the bumper components 56 may be attached to one or more of the support structures 36 and may include one or more arms 62 that extend radially outward to a circular bumper 64 that contacts the inner surface 26 of the tower wall 25. As shown in the illustrated embodiment, the bumper 64 may have a generally circular shape that matches the shape of the inner surface 26. Alternatively, as shown in FIG. 9, each of the radial arms 62 may include a point bumper 64 such that the bumper component 60 only contacts the inner surface 26 at a few select locations. As such, the bumper component(s) 60 as described herein limit oscillations of the tower structure assembly 34 without requiring mechanical connections to the tower wall 25.

Figure 10:
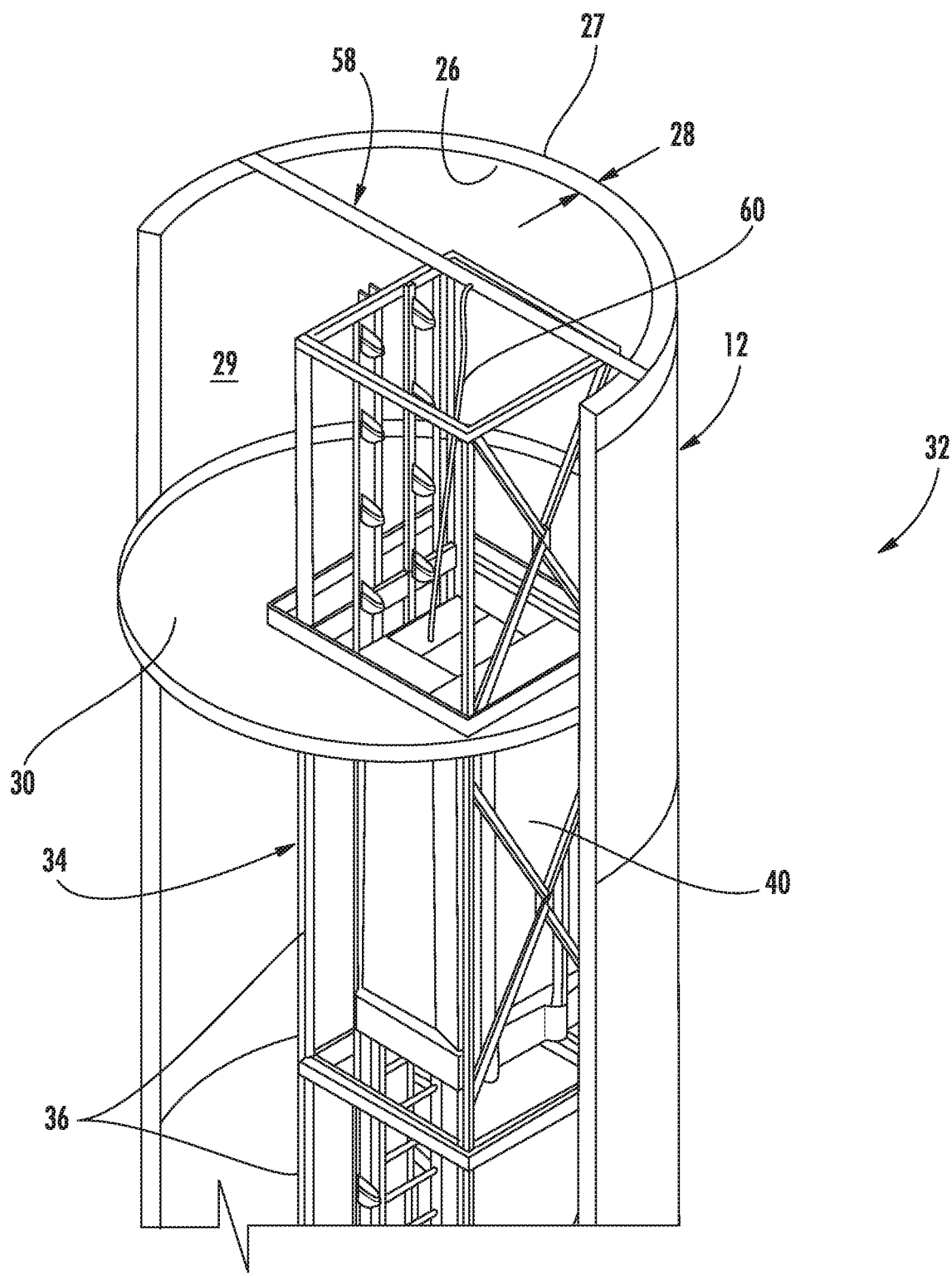
FIG. 10 illustrates a partial, perspective view of one embodiment of an internal tower structure assembly within a wind turbine tower according to the present disclosure, particularly illustrating a plurality of bumper components positioned within the tower for reducing oscillations of the structure assembly.

Referring now to FIG. 10, the tower structure assembly 34 may also include at least one cross beam 58 positioned in the tower interior 29 for supporting the service lift 40. For example, as shown, the cross beam is mounted across the tower interior 29 to the inner surface 26 of the tower wall 25 such that one or more cables 60 and/or associated pulleys (not shown) can be secured thereto. As such, the service lift 40 may be easily lifted and/or lowered within the tower interior 29 and through the internal tower structure assembly 34.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tower assembly for a wind turbine positioned, the tower assembly comprising:
   a tower comprising a tower wall having an inner surface and an outer surface separated by a tower wall thickness, the inner surface defining a tower interior; and
   an internal tower structure assembly positioned within the tower interior and being freestanding within the tower interior, the tower structure assembly comprising:
     a plurality of stackable support structures configured to support one or more internal tower components,
     a stackable base support structure positioned between a foundation and the plurality of stackable support structures and being sized to fit over a power converter of the wind turbine, the stackable base support structure being larger than any of the plurality of stackable support structures, and
     a grating platform positioned atop the stackable base support structure to allow a fan to exhaust.

2. The tower assembly of claim 1, wherein each of the plurality of stackable support structures comprises one or more alignment pins arranged on a top surface thereof that is configured to secure the stackable support structure to an adjacent stackable support structure.

3. The tower assembly of claim 2, wherein the top surface of each of the plurality of stackable support structures defines a plurality of corners, each of the corners comprising one of the alignment pins.

4. The tower assembly of claim 1, further comprising at least one bumper component coupled to the internal tower structure assembly and contacting the inner surface of the tower wall, the bumper component configured to reduce oscillations of the tower structure assembly within the tower interior.

5. The tower assembly of claim 1, wherein the one or more internal tower components further comprise at least one of one or more ladders, one or more platforms, a service lift, cables, a drip loop, a fall arrest system, a transformer, a fan, and a wind turbine controller.

6. The tower assembly of claim 5, wherein the internal tower structure assembly further comprises at least one cross beam positioned in the tower interior for supporting the service lift.

7. The tower assembly of claim 5, wherein the internal tower structure assembly further comprises one or more attachment arms extending from one or more of the plurality of stackable support structures for supporting the one or more ladders.

8. The tower assembly of claim 5, wherein one or more of the plurality of stackable support structures further comprises a first side defining the a plurality of cable trays.

9. The tower assembly of claim 1, further comprising a base platform comprising an aperture configured to receive the stackable base support structure of the tower structure assembly.

10. The tower assembly of claim 9, further comprising an additional ladder extending from a foundation of the tower through the base platform.

11. A wind turbine, comprising:
a nacelle;
a rotor mounted to the nacelle, the rotor comprising a rotatable hub and at least one rotor blade;
a tower assembly supporting the nacelle, the tower assembly comprising:
a tower comprising a tower wall having an inner surface and an outer surface separated by a tower wall thickness, the inner surface defining a tower interior; and
an internal tower structure assembly positioned within the tower interior and being freestanding within the tower interior, the tower structure assembly comprising:
a plurality of stackable support structures configured to support one or more internal tower components,
a stackable base support structure positioned between a foundation of the wind turbine and the plurality of stackable support structures and being sized to fit over a power converter of the wind turbine, the stackable base support structure being larger than any of the plurality of stackable support structures, and
a grating platform positioned atop the stackable base support structure to allow a fan to exhaust.

12. The wind turbine of claim 11, wherein each of the plurality of stackable support structures comprises one or more alignment pins arranged on a top surface thereof that is configured to secure the stackable support structure to an adjacent stackable support structure.

13. The wind turbine of claim 11, further comprising at least one bumper component coupled to the internal tower structure assembly and contacting the inner surface of the tower wall, the bumper component configured to reduce oscillations of the tower structure assembly.

14. The wind turbine of claim 11, wherein the one or more internal tower components further comprise at least one of one or more ladders, one or more platforms, a service lift, cables, a plurality of cable trays, a drip loop, a fall arrest system, a transformer, a fan, and a wind turbine controller.

15. The wind turbine of claim 14, wherein the internal tower structure assembly further comprises one or more attachment arms extending from one or more of the plurality of stackable support structures for supporting the one or more ladders.

16. The wind turbine of claim 14, wherein one or more of the plurality of stackable support structures further comprises a first side defining the plurality of cable trays.

17. An internal tower structure assembly for a hollow tower, the internal tower structure assembly comprising, the hollow tower comprising a base platform:
a plurality of support structures stackable atop each other in a vertical direction, each of the plurality of support structures comprising at least one alignment pin for connecting to an adjacent support structure;
a stackable base support structure positioned between a foundation and the plurality of support structures, the stackable base support structure being larger than any of the plurality of support structures; and
a grating platform positioned atop the stackable base support structure to allow a fan to exhaust,
wherein, when stacked in the vertical direction, the plurality of support structures forms a freestanding structure for placement in the hollow interior, the freestanding structure configured to support one or more internal tower components.

\* \* \* \* \*